UNITED STATES PATENT OFFICE.

MONE R. ISAACS, OF PHILADELPHIA, PENNSYLVANIA.

METHOD OF TREATING PROTEIDS.

No. 845,790.  Specification of Letters Patent.  Patented March 5, 1907.

Application filed April 25, 1906. Serial No. 313,658.

*To all whom it may concern:*

Be it known that I, MONE R. ISAACS, a citizen of the United States, and a resident of the city of Philadelphia, State of Pennsylvania, have invented certain new and useful Improvements in Methods of Treating Proteids and the Composition of Matter Produced Thereby, of which the following is a full, clear, and complete disclosure.

My invention has reference to a method of treating animal and vegetable proteids for the purpose of improving the quality of glue or sizing in which said proteids may be employed—for instance, milk-curd or casein—the object being to produce a more or less waterproof glue, as well as to regulate the setting and drying properties of the same.

When alkalies—such as borax, soda, potash, lime, phosphates, and ammonia—are used as solvents for converting casein into glue or sizing, the quality of the glue or sizing is impaired for many purposes for which it is adapted for use, this impairment being due to the fact that when so treated it is not sufficiently adhesive and is slow in setting. When lime alone is used as a substance to render casein soluble, it is found that the glue or sizing produced by that method sets too rapidly, due to the conversion of the casein into a caseinate of lime, which when in solution I have found becomes very thick and more or less insoluble after standing a few hours.

By my method, I treat the proteid with lime and compounds of hydrofluoric acid, combining the compound of hydrofluoric acid, such as alkaline fluorids, with the proteid, and I have found in practice that the proportion of the fluorid will vary from about two to ten per cent., while the proportion of lime will vary from five to twenty per cent., due to the quality of the composition which it is desired to produce, an increase in the proportion of the fluorid retarding the setting of the lime. I have also found in practice that sodium fluorid is the most convenient as well as the most suitable for the above purpose; but my method and the composition produced thereby is not confined to the use of sodium fluorid, as any other soluble fluorid or compound of hydrofluoric acid may be used—for example, potassium fluorid or ammonium fluorid.

An additional advantage due to my invention is that any ordinary animal and vegetable proteid—such as hide, glue, casein, starch, resin, gums, &c., which are commonly used for glues or sizings—are enriched and made moisture-proof by the use of the ingredients above set forth. The glues or sizings thus made are additionally fast with or without colors, and their quality of being waterproof when dry is also increased.

As an additional advantage I find that by dissolving the above-described mixture in water I can produce an excellent sizing or mordant for making fast colors, alone or in connection with mineral matter, for finishing and coating paper, oil-cloth, fabrics, yarns, wood, and iron, and for making paint and that when dissolved in water in suitable proportions an excellent glue is obtained adapted particularly for joining woodwork, &c., having when dry more or less waterproof qualities.

Having thus described my improved method and the composition of matter produced thereby, what I claim, and desire to protect by Letters Patent of the United States, is—

1. A composition of matter comprising a proteid, lime, and a fluorid.

2. A composition of matter comprising a proteid, lime, and from about two to ten per cent. of a fluorid.

3. A composition of matter comprising substantially one hundred parts of casein, five to twenty parts of lime and two to twelve parts of a fluorid.

4. A composition of matter comprising casein, lime, and a fluorid.

5. A composition of matter comprising casein, lime, and sodium fluorid.

6. A composition of matter comprising casein, lime, fluorid and water.

7. A composition of matter comprising casein, lime, sodium fluorid and water.

8. A composition of matter comprising substantially one hundred parts of casein, five to twenty parts of lime, and two to twelve parts of sodium fluorid.

In witness whereof I have hereunto set my hand this 24th day of April, A. D. 1906.

MONE R. ISAACS.

Witnesses:
HARRY COBB KENNEDY,
ALEXANDER PARK.